UNITED STATES PATENT OFFICE.

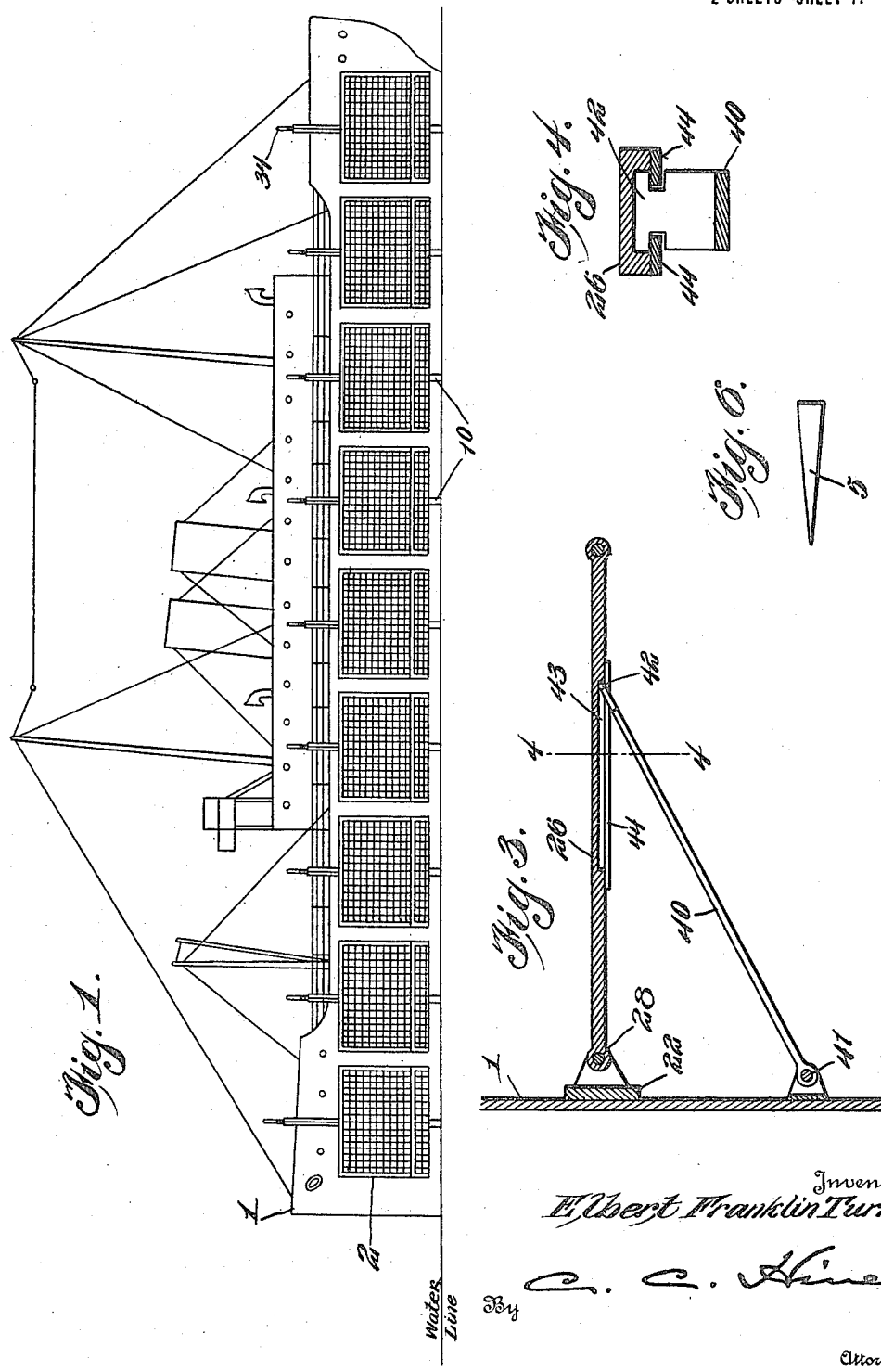

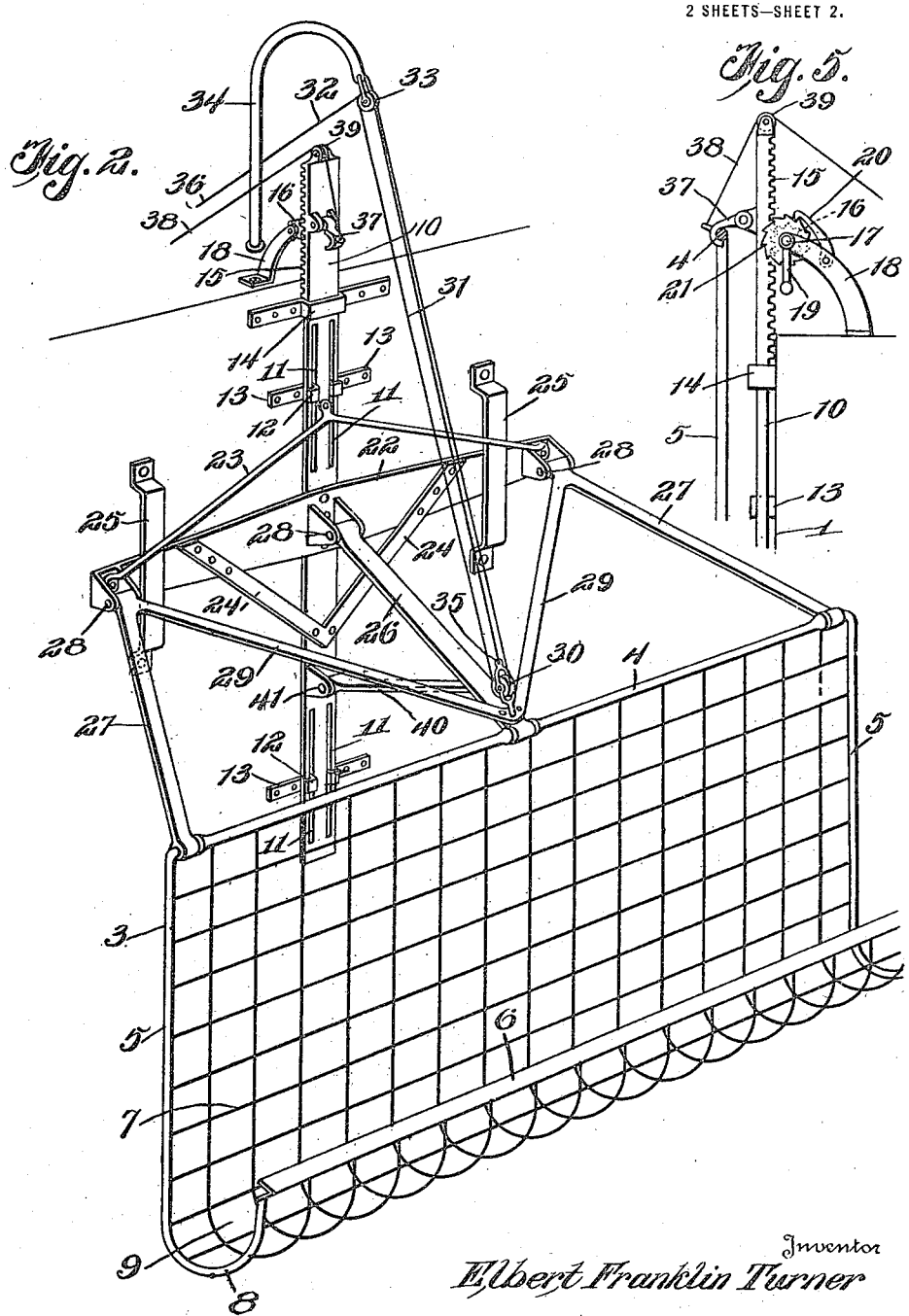

ELBERT FRANKLIN TURNER, OF TULSA, OKLAHOMA.

PROTECTOR FOR VESSELS.

1,277,506.  Specification of Letters Patent.  Patented Sept. 3, 1918.

Application filed June 20, 1917. Serial No. 175,960.

*To all whom it may concern:*

Be it known that I, ELBERT FRANKLIN TURNER, a citizen of the United States, residing at Tulsa, in the county of Tulsa and State of Oklahoma, have invented new and useful Improvements in Protectors for Vessels, of which the following is a specification.

This invention relates to protectors for vessels, and particularly to a torpedo protecting net for battleships and other marine craft, the primary object of the invention being to provide a net, of which a series may be used on each side of the ship, which may be readily and conveniently lowered for use to protect the side of the ship below the water line when in danger of attack, and which may be raised and held normally in a suspended condition to avoid resistance to the travel of the vessel through the water.

A further object of the invention is to provide a net having means for arresting the motion of a torpedo and holding the same until its propelling force is exhausted, and for catching and holding the torpedo so that it may be captured and recovered by the crew of the vessel attacked or by an escort ship, the construction of the net also being such as to ward off or deflect the nose of the torpedo to prevent the same from striking squarely and with sufficient force to effect its explosion.

A still further object of the invention is to provide a net which, even in the event of the explosion of the torpedo, will act as an effective barrier to prevent material damage to the vessel.

A still further object of the invention is to provide simple and effective means whereby, when the vessel is in danger of attack, all of the guard nets may be simultaneously lowered to give quick protection.

With these and other objects in view, the invention consists of the features of construction, combination and arrangement of parts hereinafter fully described and claimed, reference being had to the accompanying drawings, in which:—

Figure 1 is a side elevation of a battleship equipped with my improved protecting nets, shown raised in normal position to a point above the water line.

Fig. 2 is a perspective view of one of the nets in lowered position.

Fig. 3 is a vertical section through the central swinging arm of the net supporting frame and showing the bracing device associated therewith.

Fig. 4 is a detail transverse section on the line 4—4 of Fig. 3.

Fig. 5 is a detail side elevation of a portion of the net and its supporting frame, the net appearing in section, showing the net held in an elevated position.

Fig. 6 is a detail view showing the form the portions of the net may have for a warding off or deflecting action.

In carrying my invention into practice, I dispose upon each side of the battleship 1 or other vessel to be protected a longitudinal series of protecting nets 2, said nets being individually supported in position above the normal water line, but capable of being simultaneously lowered for action. The nets are adapted to be raised independently for convenience in lifting them by hand or other power, and are arranged in longitudinal alinement and sufficiently close together to prevent a torpedo from passing through the spaces between them.

Each net comprises a rectangular or oblong rectangular open frame 3 of any suitable material, and comprising an upper horizontal cross bar 4, depending side bars 5 and a bottom bar 6, the space inclosed by the bars of the frame being filled by a netting 7 of wire, chains or other suitable material. The net is designed to hang, when operatively arranged, in a substantially vertical position, and the side bars 5 thereof are provided with upturned lower ends 8 forming, with the lower cross bar 6, a U-shaped channel or trough 9. The cross bar 6 is thus disposed in advance of the lower portion of the body of the net, and coöperates with the bent ends 8 of the side bars 5 and the connecting portions of the net fabric 7, to form an advance fender or guard which under all ordinary conditions will receive the force of impact of the torpedo. The bar 6 is preferably V-shaped in cross section, its lower web being secured to the portions 8 and net work material, while its upper web is disposed at an upward and inward angle, so as to form a beveled or sloping surface. This surface is designed to deflect the nose of the torpedo upwardly, in the event that the course of travel of the torpedo is sufficiently below the water line, whereby the motion of the torpedo will be partially arrested before it comes in contact with the body of the net 7. When the torpedo comes in contact with the net, the meshes of which are sufficiently large to receive its nose portion, but not sufficiently large to allow the torpedo to pass, the torpedo will be hung or caught therein and held until its propelling force is expended. The tendency of the torpedo will then be to drop, and it will accordingly fall into the receiving channel or trough 9 in which it will be held until removed by the crew of the attacked vessel or a crew from an escort vessel. By this means the torpedo will be captured and may be reused by the captors, and dangers arising from its escape and substantial flotation prevented.

The net 2 is supported by a main frame comprising a vertically disposed supporting bar 10 mounted upon the side of the ship, said bar being vertically movable and provided at spaced intervals with slots 11 to receive angularly bent guiding and holding lugs 12 upon supporting brackets 13 fixed to the side of the ship, the upper portion of the bar being also movable through a guide member 14 arranged in proximity to the upper deck line. The inner surface of the bar is provided at its upper end with ratchet teeth 15 adapted for meshing engagement with a pinion 16 on a raising and lowering shaft 17 mounted upon a suitable support 18 on the deck of the vessel, said shaft 17 being operative through the medium of a hand crank 19 or other suitable means for the purpose of raising and lowering the bar 10 through the gearing just described. A dog or pawl 20 of a suitable type is provided to engage a ratchet wheel 21 fixed to the shaft, whereby the bar 10 will be normally held locked in adjusted position, the dog being however adapted to ride over the ratchet teeth to permit the shaft to be turned and the bar to be raised in an obvious manner. It will thus be understood that the frame bar 10 is adjustably mounted so that it may be raised and lowered to support the net at a higher or lower level with respect to the water line and according to the draft of the ship. Secured to the bar 10 is a cross bar 22, which extends beyond opposite sides thereof, which cross bar has its end portions reinforced from the bar 10 by upper and lower V-shaped braces 23 and 24, the ends of the bar 22 being held and arranged for vertical movement in keeper loops or straps 25 secured to the sides of the ship.

The net 2 is directly carried by a swinging frame composed of a central swinging arm 26 and a pair of side swinging arms 27 which are pivotally connected at their outer ends with the cross bar 4 of the net frame, and are hinged at their inner ends, as indicated at 28, to the cross piece 22, the rear ends of the arms 27 being connected by a V-shaped brace member 29 with the outer end of the arm 26, whereby said arms are coupled for movement in unison and are mutually reinforced and braced. Mounted upon the outer end of the arm 26 or apex of the brace 29 is a sheave or pulley 30, around which passes one end of the looped portion 31 of a raising and lowering cable 32, the opposite end of said looped portion of the cable passing around a supporting and guide pulley 33 carried by a davit or supporting bracket 34 disposed upon the deck of the ship, one end of said cable being connected with the block or frame of the pulley 30, indicated at 35, while the opposite end 36 of the cable may be arranged to be manually operated by hand or the use of an equivalent so that the cable may be operated in an obvious manner to swing the frame upwardly or downwardly and thereby raise and lower the fender. It will, of course, be understood that the cables 32 associated with all of the nets on one or both sides of the ship may be suitably controlled for simultaneous release, so that all of the nets on either or both sides of the ship may be dropped for protecting action at the same time.

Each net when elevated will be raised clear of the water by the action of the swinging frame arms, which may also be raised and lowered by raising and lowering the frame bar 10. When elevated to a maximum degree the arms 26 and 27 and the net 2 will lie parallel with the side of the ship, and the net and swinging frame may then be held in an upraised position by a pivot locking dog or latch 37 mounted upon the upper end of the frame bar 10, which dog or latch is of hooked form to engage the bar 4 and normally maintains its locking position by gravity. Connected with the dog or latch is a trip cord 38 passing over a pulley 39 on the bar 10 to a suitable point at which it may be secured or confined against displacement. The series of trip lines may be arranged to be operated simultaneously to retract all the dogs or latches, thus allowing the nets to drop down to a working position, or to a position above the water line so that they may be subsequently lowered to working position by paying out the cables 32. For the purpose of reinforcing the swinging frame to effectually withstand the weight of the net, and brace the parts to withstand the strain of the net traveling through the water, a brace 40 is provided which is pivoted at one end 41 to the frame bar 10 and has its opposite end formed with a T-shaped head 42 slidably engaging a groove or recess 43 in the underside of the arm 26, the head traveling in the groove in the up and down swinging movements of the arm and abutting against the outer end wall of the groove when the arm is lowered to be supported in position. A slotted cover plate 44 is provided to partially cover the groove 43, and through this slot in the plate the reduced neck of the T-shaped head extends, thus detachably connecting the parts together, while slidably retaining the head in position. In practice it is intended to form the bars and net fabric of the guard net of tapered form, as illustrated in Fig. 6, the angular surfaces of the parts being thus effectually adapted to deflect the torpedo as described.

From the foregoing description, taken in connection with the drawings, it will be seen that my invention provides a net which is simple of construction, reliable and efficient in action, and adapted to perform its stated purposes with a high degree of perfection. While the construction disclosed is preferred, it will, of course, be understood that modifications falling within the scope of the appended claims may be made, without departing from the spirit or sacrificing any of the advantages of the invention.

Having thus fully described my invention, I claim:

1. A torpedo guard for ships comprising a main frame adjustably mounted upon the side of the ship, means for raising and lowering said frame, a vertically swinging frame carried by the main frame, a net pivotally supported by the swinging frame, and means for vertically adjusting the swinging frame and net independently of the main frame.

2. A torpedo guard for ships comprising a main frame, a swinging frame carried by the main frame, a torpedo net pivotally supported by the swinging frame, a bracing element pivoted to the main frame and slidably and pivotally connected with the swinging frame, and means for raising and lowering the swinging frame and net.

3. A torpedo guard for ships comprising a main frame, means for raising and lowering the same, a vertically swinging frame carried by the main frame, a net pivotally supported by the swinging frame, means for raising and lowering the swinging frame and net independently of the main frame, and a brace pivotally connected with the main frame and slidably and pivotally connected with the swinging frame.

4. A torpedo guard for ships comprising a main frame adjustably mounted upon the side of the ship, said frame having a rack bar connected therewith, a vertically swinging frame hinged to the main frame, a gear element upon the ship meshing with the rack bar for raising and lowering the main frame, a torpedo net pivoted to the swinging frame, and means for raising and lowering the swinging frame and torpedo net independently of the main frame.

5. A torpedo guard for ships comprising a frame adjustably mounted upon the side of the ship, means for raising and lowering said frame for vertical adjustment, a net, means pivotally supporting the net from the adjustable frame for raising and lowering movements, and means for raising and lowering the net.

6. A torpedo guard for ships comprising a vertically movable and adjustable frame, means for raising and lowering the frame, a net pivotally mounted upon the frame for raising and lowering movements, means for raising and lowering the net, a latch device for holding the net elevated, and means for releasing the same.

7. A torpedo guard for ships comprising a main frame bar mounted for vertical adjustment upon the side of the ship, means for raising and lowering said frame bar, a cross bar carried by the main frame bar, a swinging frame hinged to the cross bar, a torpedo net pivoted to the swinging frame, a brace pivoted to the main frame and slidably and pivotally connected with the swinging frame, and means for raising and lowering the swinging frame and torpedo net independently of the main frame.

8. A torpedo guard for ships comprising a frame adjustably secured upon the side of the ship, means for raising and lowering said frame, swinging arms carried by the frame, a net pivotally supported by said arms, a brace pivotally connected with the frame and slidably and pivotally connected with the swinging arms, means for raising and lowering the swinging arms, a latch device carried by the frame for holding the net in an upraised and folded position, and means for releasing said latch.

In testimony whereof I affix my signature.

ELBERT FRANKLIN TURNER.

Copies of this patent may be obtained for five cents each, by addressing the "Commissioner of Patents, Washington, D. C."